(12) United States Patent
Giles

(10) Patent No.: US 12,098,545 B2
(45) Date of Patent: Sep. 24, 2024

(54) HFO-CONTAINING ISOCYANATE-REACTIVE COMPOSITIONS, RELATED POLYURETHANE FOAM-FORMING COMPOSITIONS, AND SPRAY-APPLIED POLYURETHANE FOAMS

(71) Applicant: Covestro LLC, Pittsburgh, PA (US)

(72) Inventor: Eric C. Giles, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 499 days.

(21) Appl. No.: 17/361,872

(22) Filed: Jun. 29, 2021

(65) Prior Publication Data

US 2022/0412080 A1 Dec. 29, 2022

(51) Int. Cl.
| C08G 18/18 | (2006.01) |
| C08G 18/20 | (2006.01) |
| C08G 18/24 | (2006.01) |
| C08G 18/42 | (2006.01) |
| C08G 18/72 | (2006.01) |
| C08J 9/14 | (2006.01) |
| E04B 2/84 | (2006.01) |

(52) U.S. Cl.
CPC .......... *E04B 2/847* (2013.01); *C08G 18/1808* (2013.01); *C08G 18/1825* (2013.01); *C08G 18/2027* (2013.01); *C08G 18/242* (2013.01); *C08G 18/4219* (2013.01); *C08G 18/72* (2013.01); *C08J 9/148* (2013.01); *C08G 2110/0058* (2021.01); *C08J 2203/164* (2013.01); *C08J 2375/04* (2013.01)

(58) Field of Classification Search
CPC ............ C08G 18/1808; C08G 18/1825; C08G 18/2027; C08G 18/242; C08G 18/4018; C08G 18/4208; C08G 18/4219; C08G 18/72; C08G 18/7664; C08G 2110/0025; C08G 2110/005; C08G 2110/0058; C08J 9/02; C08J 9/146; C08J 9/148; C08J 2203/142; C08J 2203/162; C08J 2203/164; C08J 2207/04; C08J 2375/04; C08J 2375/06; E04B 2/847
See application file for complete search history.

(56) References Cited

U.S. PATENT DOCUMENTS

| 8,299,137 B2 | 10/2012 | Loh et al. |
| 9,556,335 B2 | 1/2017 | Chen et al. |
| 9,809,674 B2 | 11/2017 | Shieh |
| 9,988,483 B2 | 6/2018 | Forkner et al. |
| 10,059,824 B2 | 8/2018 | Taylor et al. |
| 10,131,758 B2 | 11/2018 | Younes et al. |
| 10,280,275 B2 | 5/2019 | Okada et al. |
| 10,392,487 B2 | 8/2019 | Taylor et al. |
| 2007/0100009 A1 | 5/2007 | Creazzo et al. |
| 2010/0210747 A1 | 8/2010 | Loh et al. |
| 2010/0216904 A1 | 8/2010 | Loh et al. |
| 2011/0124756 A1 | 5/2011 | Singh et al. |
| 2012/0313035 A1 | 12/2012 | Williams et al. |
| 2014/0220333 A1 | 8/2014 | Bogdan |
| 2015/0210818 A1 | 7/2015 | Loh |
| 2015/0232631 A1 | 8/2015 | Balbo Block et al. |
| 2016/0145374 A1 | 5/2016 | Ishikawa |
| 2016/0152739 A1 | 6/2016 | Eilbracht et al. |
| 2018/0022885 A1* | 1/2018 | Younes ............... C08G 18/7671 427/243 |
| 2019/0136005 A1 | 5/2019 | Williams et al. |
| 2019/0322790 A1 | 10/2019 | Rider et al. |
| 2019/0322791 A1 | 10/2019 | Rider et al. |
| 2020/0247938 A1 | 8/2020 | Li et al. |
| 2020/0247941 A1 | 8/2020 | Yu et al. |
| 2020/0283561 A1 | 9/2020 | Parks |
| 2020/0283563 A1 | 9/2020 | Parks et al. |
| 2020/0339733 A1 | 10/2020 | Rider et al. |
| 2022/0064358 A1 | 3/2022 | Sendijarevic |
| 2022/0169816 A1 | 6/2022 | Yu et al. |

FOREIGN PATENT DOCUMENTS

| CN | 103709727 A | 4/2014 |
| CN | 104497251 A | 4/2015 |
| CN | 108164737 A | 6/2018 |
| CN | 109485903 A | 3/2019 |
| WO | 2007053670 A2 | 5/2007 |
| WO | 2009014965 A1 | 1/2009 |
| WO | 2012105657 A1 | 8/2012 |
| WO | 2012115936 A2 | 8/2012 |
| WO | 2014133986 A1 | 9/2014 |
| WO | 2014134087 A1 | 9/2014 |
| WO | 2015050139 A1 | 4/2015 |
| WO | 2017050887 A1 | 3/2017 |
| WO | 2018167220 A1 | 9/2018 |
| WO | 2020223059 A1 | 11/2020 |
| WO | 2021011521 A1 | 1/2021 |

* cited by examiner

*Primary Examiner* — John M Cooney
(74) *Attorney, Agent, or Firm* — Donald R. Palladino

(57) ABSTRACT

Isocyanate-reactive compositions that include a hydrofluoroolefin blowing agent, polyurethane foam-forming compositions, as well as spray-applied polyurethane foams formed therefrom that can provide structural support to wall structures and can also exhibit ASTM E84-16 Class A flame spread and smoke development characteristics at a foam thickness of 4 inches.

16 Claims, No Drawings

HFO-CONTAINING ISOCYANATE-REACTIVE COMPOSITIONS, RELATED POLYURETHANE FOAM-FORMING COMPOSITIONS, AND SPRAY-APPLIED POLYURETHANE FOAMS

FIELD

This specification relates to isocyanate-reactive compositions that include a hydrofluoroolefin blowing agent, as well as to related spray-applied polyurethane foams formed therefrom that can provide structural support to wall structures and that also exhibit ASTM E84-16 Class A flame spread and smoke development characteristics at a foam thickness of 4 inches.

BACKGROUND

Spray polyurethane foams (SPFs) are often formed by combining a polyol component and a polyisocyanate in the presence of water and a physical blowing agent. Aromatic polyester polyols and sucrose-based polyether polyols are often used in the polyol component. Such polyols are often selected for SPF applications, such as wall or roof insulation applications, because of fire resistance properties they tend to impart to the foam.

Historically, the physical blowing agents used in SPFs have been chlorofluorocarbons (CFCs) and hydrochlorofluorocarbons (HCFCs). CFCs and HCFCs are, however, now disfavored because of their ozone depletion potential and relatively high global warming potential. As a result, alternative physical blowing agents are under consideration.

One class of alternative physical blowing agents with low or no ozone depletion potential and low global warming potential are certain halogenated olefins, such as fluoroolefins, that include at least one halogen, such as fluorine, and at least one carbon-carbon double bond. Some of these fluoroolefins also include hydrogen and, as a result, are sometimes referred to as hydrofluoroolefins or HFOs.

Relatively recently, insulated wall structures satisfying strict industry insulation requirements have been developed that can be made without excessive material and labor costs. According to one proposal, a foam wall structure includes a foam panel, such as a faced polyisocyanurate panel, attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

Such foam wall structures can provide many benefits. They can exhibit high racking shear strength, even without the use of OSB, plywood, or other structural sheathing materials, and excellent thermal resistance. Moreover, they can be fabricated in a controlled, possibly highly automated, manufacturing facility that is away from the construction site, thus increasing the likelihood of consistent results/performance, all while reducing labor and material costs. An important factor in achieving high racking shear strength in such wall structure is the use of a relatively high density (at least 2.8 lb/ft$^3$) structural spray-applied foam layer deposited within the frame voids. A thicker "structural foam layer" can enhance the racking shear strength performance of the wall structure.

An important factor for commercial acceptance of a foam for the construction industry is the ASTM E84 classification of the foam. In some applications, a NFPA 101 Life Cycle Safety Code Class A designation may be required. To achieve this, the foam must exhibit a flame spread index (FSI) of 25 or less and a smoke-developed index (SDI) of 450 or less according to ASTM E84-21 at the applied foam thickness.

As a result, it would be highly desirable to provide polyurethane foam-forming compositions that employ a HFO blowing agent and that are capable of producing a relatively high density structural foam layer that exhibits an ASTM-E84 Class A rating at any foam thickness and that is suitable for use in foam wall structures to provide a wall structure exhibiting high racking shear strengths, even in the absence of OSB, plywood, or other structure sheathing materials.

SUMMARY

In certain respects, this specification relates to isocyanate-reactive compositions. The isocyanate-reactive compositions comprise an aromatic polyester polyol having a functionality of greater than 2.5 and an OH number of at least 300 mg KOH/g, a catalyst, and a blowing agent composition. The aromatic polyester polyol having a functionality of greater than 2.5 and an OH number of at least 300 mg KOH/g is present in an amount of at least 50% by weight, based on the total weight of the isocyanate-reactive composition. The blowing agent composition comprises water and a hydrofluoroolefin, in which the hydrofluoroolefin is present in an amount of 1 to 6% by weight, based on the total weight of the isocyanate-reactive composition, and the hydroflouroolefin and water are present in the isocyanate-reactive composition in a relative ratio, by weight, of 4:1 to 8:1.

In other respects, this specification relates to polyurethane foam-forming compositions. The polyurethane foam-forming compositions comprise a polyisocyanate, an aromatic polyester polyol having a functionality of greater than 2.5 and an OH number of at least 300 mg KOH/g, a catalyst, and a blowing agent composition. The polyisocyanate is present in an amount sufficient to provide an isocyanate index of 70 to 150. The aromatic polyester polyol having a functionality of greater than 2.5 and an OH number of at least 300 mg KOH/g is present in an amount of at least 50% by weight, based on the total weight of the isocyanate-reactive composition. The blowing agent composition comprises water and a hydrofluoroolefin, in which the hydrofluoroolefin is present in an amount of 1 to 6% by weight, based on the total weight of the isocyanate-reactive composition, and the hydroflouroolefin and water are present in the isocyanate-reactive composition in a relative ratio, by weight, of 4:1 to 8:1

The specification also relates to, among other things, methods for making polyurethane foams using such polyurethane foam-forming compositions, polyurethane foams produced from such polyurethane foam-forming compositions, substrates having such a polyurethane foam applied thereto, as well as wall structures comprising such substrates.

DETAILED DESCRIPTION

Various embodiments are described in this specification to provide an overall understanding of the structure, function, operation, manufacture, and use of the disclosed products and processes. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "certain embodiments," or the like, means that a particular feature or characteristic may be included in an embodiment. Thus, use of the phrase "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, and without limitation, "a flame retardant" means one or more flame retardants, and thus, possibly, more than one flame retardant is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. The term "hydroxyl number", as used herein, refers to the number of reactive hydroxyl groups available for reaction, and is expressed as the number of milligrams of potassium hydroxide equivalent to the hydroxyl content of one gram of the polyol, measured according to ASTM D4274-16. The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

Equivalent weights and molecular weights given herein are number average equivalent weights and number average molecular weights respectively, as determined, unless indicated otherwise, by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As indicated, certain embodiments of this specification relate to polyurethane foam-forming compositions that comprise a polyisocyanate. As used in this specification, the term "polyisocyanate" is meant to encompass diisocyanates as well as higher functionality isocyanates. Any of the known organic polyisocyanates may be used in the present invention. Suitable polyisocyanates include aromatic, aliphatic and cycloaliphatic polyisocyanates and combinations thereof. Representative of these types are diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, pentamethylene 1,5- diisocyanate, the isomers of hexahydrotoluene diisocyanate, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyldiphenylpropane-4,4'-diisocyanate; triisocyanates, such as 2,4,6-toluene triisocyanate; and polyisocyanates, such as 4,4'-dimethyl-diphenylmethane-2,2',5,5'-tetraisocyanate and the polymethylene polyphenylisocyanates.

A crude polyisocyanate may be used, such as the crude toluene diisocyanate obtained by the phosgenation of a mixture of toluene diamines. Similarly, undistilled polyisocyanates, such as methylene bridged polyphenyl-polyisocyanates can be used and can be obtained by phosgenation of polyphenylpolymethylenepolyamines obtained by the condensation of aromatic amines, such as aniline, with formaldehyde.

Suitable modified polyisocyanates may be obtained by chemical reaction of polyisocyanates and can include, without limitation, isocyanates containing ester groups, urea groups, biuret groups, allophanate groups, carbodiimide groups, isocyanurate groups, uretdione groups and/or urethane groups.

In certain embodiments, the polyisocyanate comprises a methylene-bridged polyphenyl polyisocyanate and/or a prepolymer of a methylene-bridged polyphenyl polyisocyanate having an average functionality of 2.0 to 3.5, such as 2.1 to 3.1, isocyanate moieties per molecule, and a free NCO content of 15 to 35% by weight, such as 20 to 35% by weight, 25 to 35% by weight or, in some cases, 28 to 34% by weight. In certain embodiments, such methylene-bridged polyphenyl polyisocyanate and/or a prepolymer of a methylene-bridged polyphenyl polyisocyanate is present in an amount of at least 50% by weight, such as at least 80% by weight, at least 90% by weight, or at least 99% by weight, based on the total weight of polyisocyanate.

As also previously indicated, some embodiments of this specification relate to isocyanate-reactive compositions. As used herein, the term "isocyanate-reactive composition" refers to a composition that comprises, among other things, components that have functional groups that are reactive with isocyanate groups, i.e., the isocyanate-reactive components defined below.

The isocyanate-reactive compositions of this specification include, among other things, an aromatic polyester polyol. More specifically, the isocyanate-reactive compositions include an aromatic polyester polyol having a functionality of greater than 2.5 and an OH number of at least 300 mg KOH/g, a catalyst, and a blowing agent composition. In some implementations, the foregoing aromatic polyester polyol has a functionality of at least 2.7, such as 2.7 to 3.2 or 2.8 to 3.2. In some implementations, the foregoing aromatic polyester polyol has an OH number of 300 to 400 mg KOH/g, 300 to 380 mg KOH/g, or, in some cases 360 to 380 mg KOH/g.

The foregoing aromatic polyester polyol having a functionality of greater than 2.5 and an OH number of at least 300 mg KOH/g is present in an amount of at least 50% by weight, based on the total weight of the isocyanate-reactive composition. In some implementations, the foregoing aromatic polyester polyol having a functionality of greater than 2.5 and an OH number of at least 300 mg KOH/g is present in an amount of 50 to 90% by weight, 50 to 80% by weight, 50 to 75% by weight, 65 to 75% by weight, or, in some cases, 70 to 75% by weight, based on the total weight of the isocyanate-reactive composition.

As will be appreciated, suitable aromatic polyester polyols include, for example, typical transesterification or direct esterification reaction products of an acid or anhydride thereof with a polyol. More specifically, in some implementations, the foregoing aromatic polyester polyol comprises a transesterification or direct esterification reaction product of a reaction mixture comprising polyol, such as glycol and a higher functionality polyols, and a terephthalate source.

Specific examples of polyols suitable for use in preparing the foregoing aromatic polyester include, without limitation, di- and higher functional polyols having a molecular mass of from 62 g/mol to 400 g/mol. Specific examples of such polyols include, without limitation, 1,4-dihydroxycyclohexane, 1,2-propanediol, 1,3-propanediol, 2-methyl-1,3-propanediol, 1,5-pentanediol, 1,6-hexanediol, 1,8-octanediol, neopentyl glycol, ethylene glycol, diethylene glycol, triethylene glycol, tetraethylene glycol, dipropylene glycol, tripropylene glycol, dibutylene glycol, tripropylene glycol, glycerol, sorbitol, pentaerythritol, trimethylolpropane, natural vegetable oils, modified natural vegetable oils, fatty acid derivatives of vegetable oil, and including mixtures of two or more of any of the foregoing.

Specific examples of suitable sources of terephthalate include, without limitation, polyethylene terephthalate (PET), industrial recycled PET, post-consumer PET, terephthalic acid (TA), industrial recycled TA (BACA), phthalic anhydride, iso-phthalic acid or meta-phthalic acid.

In some specific examples, the reaction mixture may comprise 45 to 70% by weight of a glycol, 20 to 35% by weight a terephthalate source, and 5 to 20% by weight glycerin, based on the total weight of the reaction mixture used to produce the aromatic polyester polyol.

Specific examples of commercially available aromatic polyester polyols that are suitable for use in the isocyanate-reactive compositions of this specification include ISOEXTER TB-306 commercially available from Coim and TEROL 649 commercially available from Huntsman.

The isocyanate-reactive compositions of the polyurethane foam-forming compositions of the present invention can also comprise other isocyanate-reactive components, such as any of a variety of polyether polyols. In certain embodiments, however, the isocyanate-reactive composition is substantially or, in some cases, completely free of polyether polyols. In fact, it was observed that the isocyanate-reactive compositions of this specification can be suitable for producing relatively high density (2.8 lb/ft$^3$ or more) polyurethane foams that are dimensionally-stable even without using relatively high-functionality (functionality of at least 5.0) sucrose-based polyether polyols that are commonly employed to provide such dimensional stability to polyurethane spray foams. The absence of such sucrose-based polyether polyols is advantageous for improving the smoke development properties of the polyurethane foams described in this specification.

As used herein, "substantially free", when used with reference to the absence of polyether polyol in the isocyanate-reactive composition, means that polyether polyol is present, if at all, in an amount of less than 5% by weight, no more than 2% by weight, or, in some cases, no more than 1% by weight, based on the total weight of the isocyanate-reactive composition.

In certain embodiments, the isocyanate-reactive composition of the polyurethane foam-forming compositions comprises a compound, often a monomeric compound, having at least two isocyanate-reactive hydrogen atoms and a molecular weight of from 32 to 399, which can act, for example, as a chain extender/crosslinker. These compounds often contain from 2 to 8, such 2 to 4, isocyanate-reactive hydrogen atoms. Specific examples of which include, but are not limited to, ethanolamine, diethanolamine, triethanolamine, sorbitol and/or glycerol.

In certain embodiments, the foregoing chain extender/crosslinker is present in an amount of 1 to 10% by weight, such as 1 to 5% by weight, or 2 to 3% by weight, based on the total weight of isocyanate-reactive components in the isocyanate-reactive composition. Moreover, in certain embodiments, chain extender/crosslinker is present in an amount of 0.5 to 5% by weight, such as 0.5 to 2% by weight, or 1 to 2% by weight, based on the total weight of the polyurethane foam-forming composition. In fact, it was another surprising discovery that the amount of chain extender/crosslinker could be greatly reduced relative to prior Class A polyurethane spray foams of similar density, which served to reduce void formation, internal blistering, and surface cracking of the foam.

The isocyanate-reactive compositions of this specification also include a blowing agent composition. The blowing agent composition comprises water. In certain of these embodiments, water is present in an amount of 0.5 to 2% by weight, such as 0.8 to 1.5% by weight, or, in some cases, 1 to 1.5% by weight, based on the total weight of the isocyanate-reactive composition.

The blowing agent compositions of this specification also include a hydrofluoroolefin, such as a $C_2$ to $C_6$ hydrohalogenated olefin. As used herein, "$C_2$ to $C_6$ hydrohalogenated olefin" refers to a compound having 2 to 6 carbon atoms, at least one halogen atom, at least one hydrogen atom, and at least one carbon-carbon double bond. In certain embodiments, the $C_2$ to $C_6$ hydrohalogenated olefin has a boiling point of at least 10° C., such as 10° C. to 40° C. or 14° C. to 40° C., at 1 atmosphere pressure.

In certain embodiments, the $C_2$ to $C_6$ hydrohalogenated olefin comprises fluorine and, in such cases, the $C_2$ to $C_6$ hydrohalogenated olefin is a hydrofluoroolefin or HFO. In certain of these embodiments, the halogen also comprises chlorine and, in such cases, the $C_2$ to $C_6$ halogenated olefin is a hydrofluorochloroolefin or HFCO.

Suitable HFOs include, without limitation, any of the isomers of 1,1,1,4,4,4-hexafluoro-2-butene ($CF_3CHCHCF_3$), such as the cis- and trans-forms of 1,1,1,4,4,4-hexafluoro-2-butene, as well as mixtures thereof. In some cases, for example, a blend of cis-1,1,1,4,4,4-hexafluoro-2-butene and trans-1,1,1,4,4,4-hexafluoro-2-butene may be used in which the cis-isomer is present in an amount of 1 to 99% by weight, 10 to 90% by weight, or 20 to 80% by weight and the trans-isomer is present in an amount of 99 to 1% by weight, 90 to 10% by weight, or 80 to 20% by weight, based on the total weight of 1,1,1,4,4,4-hexafluoro-2-butene that is present.

In some embodiments, the $C_2$ to $C_6$ hydrohalogenated olefin comprises a compound having the structure:

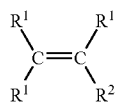

wherein each $R^1$, which may be the same or different, is chlorine, fluorine, bromine, iodine or hydrogen, with the proviso that at least one $R^1$ is hydrogen, $R^2$ is $(CR^1_2)_nX$, X is $CR^1F_2$, and n iso, 1, 2, or 3.

In certain embodiments, the $C_2$ to $C_6$ hydrohalogenated olefin comprises a $C_3$ to $C_4$ hydrohalogenated olefin, such as a compound of the above structure in which n is 0, at least one $R^1$ is H, at least one other $R^1$ is chlorine, and X is $CF_3$. Trifluoro, monochloropropenes are examples of such compounds. Suitable trifluoro, monochloropropenes include, for example, 1,1,1-trifluoro-2,chloro-propene (HFCO-1233xf) and both cis- and trans-1,1,1-trifluoro-3-chloropropene (HFCO-1233zd). The term HFCO-1233zd herein encompasses both the cis- and trans-forms of 1,1,1-trifluo-3,chloropropene, including various mixtures thereof. The terms "cisHFCO-1233zd" and "transHFCO-1233zd" are used herein to describe the cis- and trans-forms of 1,1,1-trifluo, 3-chlororopropene, respectively. In certain embodiments, transHFCO-1233zd is predominantly (at least 90 percent by weight, based on the total weight of HFCO-1233zd) or exclusively used.

In certain embodiments, the $C_2$ to $C_6$ halogenated olefin is present in an amount of 1 to 6% by weight, such as 3 to 6% by weight, or 5 to 6% by weight, based on the total weight of the isocyanate-reactive composition.

Moreover, in the isocyanate-reactive compositions of this specification, the hydroflouroolefin and water are present in the isocyanate-reactive composition in a relative ratio, by weight, of 4:1 to 8:1, such as 4:1 to 6:1 or 4:1 to 5:1.

As will be appreciated, other blowing agents, such as carbon dioxide, hydrocarbons, such as n-pentane, cyclopentane, and isopentane, and/or polyfluoroalkanes, could be used if desired. In some implementations, however, the isocyanate-reactive compositions of this specification are substantially, or, in some cases, completely free of such other blowing agent. As used herein, "substantially free", when used with reference to the absence of a blowing agent in the isocyanate-reactive composition, means that such other blowing agent is present, if at all, in an amount of no more than 5% by weight or, in some cases, no more than 1% by weight, based on the total weight of the blowing agent composition.

In certain embodiments, the amount of blowing agent used in the isocyanate-reactive composition is such that the resulting foam has a density, as determined by ASTM D1622-14, of at least 44 kg/m³, at least 48 kg/m³, or at least 51 kg/m³, and no more than 160 kg/m³, such as no more than 80 kg/m³, or no more than 60 kg/m³.

Other ingredients can be included in the isocyanate-reactive composition used in the polyurethane foam-forming compositions of the present invention. In certain embodiments, the isocyanate-reactive composition comprises a flame retardant. Suitable flame retardants include, but are not limited to, brominated flame retardants, such as a brominated polyol and (ii) a phosphonated flame retardants, such as a halogenated, such as chlorinated, phosphates, includes mixtures thereof.

In addition, in some embodiments, the isocyanate-reactive composition further comprises a surfactant to, for example, stabilize the foaming reaction mixture until it obtains rigidity. Such surfactants often comprise a liquid or solid organosilicon compound, a polyethylene glycol ether of a long chain alcohol, a tertiary amine, an alkanolamine salt of a long chain alkyl acid sulfate ester, an alkylsulfonic ester, or an alkylarylsulfonic acid, or a mixture thereof. Often, 0.5 to 10 parts by weight of the surfactant per 100 parts of the isocyanate-reactive composition is used.

One or more catalysts are also often used in the isocyanate-reactive composition. Any suitable urethane catalyst may be used including the known tertiary amine compounds and organometallic compounds. Examples of suitable tertiary amine catalysts include, without limitation, triethylenediamine, N-methylmorpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include, without limitation, organomercury, organolead, organobismuth, organozinc, organoferric and organotin catalysts. Suitable organotin catalysts include, without limitation, tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, or certain tertiary amines may also optionally be employed herein. Such catalysts are used in an amount which measurably increases the rate of reaction of the polyisocyanate. Typical amounts are 0.1 to 10.0 part of catalyst per 100 parts by weight of polyol. Examples of such catalysts include the potassium salts of carboxylic acids such as potassium octoate, and the tertiary amine N,N',N"-tris(3-dimethylaminopropyl) hexahydro-s-triazine.

Other suitable ingredients, if desired, include reaction retarders, cell regulators, emulsifiers, foam stabilizers, colorants, such as pigments and dyes, and fillers, such as, but not limited to, barium sulfate and calcium carbonate.

As indicated earlier, the polyurethane-foam forming composition described herein can be particularly suitable for use in SPF applications. As a result, certain embodiments of the present invention are directed to methods for producing a polyurethane foam. In some embodiments, these methods comprise: (a) impingement mixing a polyurethane foam-forming composition as described above in a spray gun; and (b) spraying the mixture onto a surface. In certain embodiments, the resulting foam is a rigid foam which can be particularly suitable for use as insulating foam in architectural (wall and roofing), automotive, appliance, and other applications. As such, in certain embodiments, the substrate used in the methods of the present invention is embodied as a building component, such as a wall, floor, or ceiling.

In certain embodiments of the methods of the present invention, the polyisocyanate and isocyanate-reactive composition are combined in a relative volume ratio of 1.5:1 to 1:1.5, such as 1.1:1 to 1:1.1. In certain embodiments of the methods of the present invention, the polyisocyanate and isocyanate-reactive composition are combined in relative amounts such that the NCO Index (ratio of isocyanate groups to isocyanate-reactive groups multiplied by 100) is 70 to 150, 90 to 150, 90 to 135, 100 to 135 or 100 to 120.

Certain embodiments of the present invention are also directed to the resulting foams having, for example, a density as described above. In certain embodiments, the resulting foams are closed cell foams, which, as used herein, means that the foam has a closed cell content of at least 80% by volume, such as at least 85% by volume, or at least 90% by volume, measured according to ISO 4590:2002.

In certain embodiments, the polyurethane-foam forming compositions described herein form a foam having a Class A rating (flame spread index of no more than 25 and smoke development index of no more than 450), determined according to the ASTM E 84 test. More particularly, it was discovered, surprisingly, that, in some implementations, the foam may have such a Class A rating at a foam thickness of 4 inches, which can classify the foam as a Class A at an unlimited foam thickness. In addition, this Class A rating is achieved with a relatively high density foam that can provide structural support in modern and novel home building methods. More specifically, in some implementations, the foam can be particularly advantageous in the production of foam wall structures. Such foam wall structures may comprise: (a) a frame comprising: a first member; a second member spaced apart from the first member; and connecting members extending between the first member and the second member, wherein the first member, the second member, and the connecting members each comprise a front surface and a rear surface that form a front frame surface and a rear frame surface; (b) a foam panel, such as a faced polyisocyanurate foam panel, disposed over the front frame surface; and (c) a foam layer disposed in between the first member, the second member, and connecting members, wherein the foam layer comprises polyurethane foam having a density of at least 2.8 lb/ft$^3$ (44.9 kg/m$^3$), in some cases at least 3.0 lb/ft$^3$ (44.9 kg/m$^3$), when measured according to ASTM D1622-14, and comprises a reaction product of a polyurethane foam-forming composition as described in this specification. In some implementations, the foam panel directly overlies the front frame surface and, as a result, the foam layer adheres directly to the foam panel, while, in other embodiments, the foam may adhere to a component, such as a metal sheet or metal mesh, that may be disposed between the foam front surface and the foam panel. Foam wall structures for which use of foams as described herein may be particularly advantageous include those described in U.S. Patent Application Publication Nos. US 2014/0053486 A1, US 2017/0037615 A1, US 2017/0037637 A1, US 2018/0363298 A1, US 2018/0112394 A1, and US 2019/0242125 A1, and U.S. patent application Ser. Nos. 16/790,022, 16/944,269 and 17/036,323, the disclosures of each of which is incorporated herein by reference.

Various aspects of the subject matter described herein are set out in the following numbered clauses:

Clause 1. An isocyanate-reactive composition comprising: (a) an aromatic polyester polyol having a functionality of greater than 2.5 and an OH number of at least 300 mg KOH/g, which is present in an amount of at least 50% by weight, based on the total weight of the isocyanate-reactive composition; (b) a catalyst; and (c) a blowing agent composition comprising: (1) water; and (2) a hydrofluoroolefin, wherein the hydrofluoroolefin is present in an amount of 1 to 6% by weight, based on the total weight of the isocyanate-reactive composition, and the hydroflouroolefin and water are present in the isocyanate-reactive composition in a relative ratio, by weight, of 4:1 to 8:1.

Clause 2. The isocyanate-reactive composition of clause 1, wherein the aromatic polyester polyol has a functionality of at least 2.7, 2.7 to 3.2 or 2.8 to 3.2.

Clause 3. The isocyanate-reactive composition of clause 1 or clause 2, wherein the aromatic polyester polyol has an OH number of 300 to 400 mg KOH/g, 300 to 380 mg KOH/g, or 360 to 380 mg KOH/g.

Clause 4. The isocyanate-reactive composition of one of clause 1 to clause 3, wherein the aromatic polyester polyol having a functionality of greater than 2.5 and an OH number of at least 300 mg KOH/g is present in an amount of 50 to 90% by weight, 50 to 80% by weight, 50 to 75% by weight, 65 to 75% by weight, or, 70 to 75% by weight, based on the total weight of the isocyanate-reactive composition.

Clause 5. The isocyanate-reactive composition of one of clause 1 to clause 4, wherein the aromatic polyester polyol having a functionality of greater than 2.5 and an OH number of at least 300 mg KOH/g comprises a transesterification or direct esterification reaction product of a reaction mixture comprising polyol, such as glycol and a higher functionality polyols, and a terephthalate source, such as where the reaction mixture comprises 45 to 70% by weight of a glycol, 20 to 35% by weight a terephthalate source, and 5 to 20% by weight glycerin, based on the total weight of the reaction mixture.

Clause 6. The isocyanate-reactive composition of one of clause 1 to clause 5, wherein the isocyanate-reactive composition is substantially or completely free of polyether polyol.

Clause 7. The isocyanate-reactive composition of one of clause 1 to clause 6, wherein the isocyanate-reactive composition comprises a compound, such as a monomeric compound, having at least two, such as 2 to 8 or 2 to 4, isocyanate-reactive hydrogen atoms and a molecular weight of from 32 to 399, such as ethanolamine, diethanolamine, triethanolamine, sorbitol, glycerol, or a mixture thereof, that is present in an amount of 1 to 10% by weight, such as 1 to 5% by weight, or 2 to 3% by weight, based on the total weight of isocyanate-reactive components in the isocyanate-reactive composition.

Clause 8. The isocyanate-reactive composition of one of clause 1 to clause 7, wherein water is present in an amount of 0.5 to 2% by weight, 0.8 to 1.5% by weight, or 1 to 1.5% by weight, based on the total weight of the isocyanate-reactive composition.

Clause 9. The isocyanate-reactive composition of one of clause 1 to clause 8, wherein the hydrofluoroolefin comprises a $C_2$ to $C_6$ hydrohalogenated olefin, such as a $C_2$ to $C_6$ hydrohalogenated olefin having a boiling point of at least 10° C., such as 10° C. to 40° C. or 14° C. to 40° C., at 1 atmosphere pressure.

Clause 10. The isocyanate-reactive composition of clause 9, wherein the $C_2$ to $C_6$ hydrohalogenated olefin comprises a hydrofluoroolefin and/or a hydrofluorochloroolefin.

Clause 11. The isocyanate-reactive composition of clause 10, wherein the hydroflouroolefin comprises 1,1,1,4,4,4-hexafluoro-2-butene, such as the cis-form of 1,1,1,4,4,4-hexafluoro-2-butene, the trans-form of 1,1,1,4,4,4-hexafluoro-2-butene, or a mixture thereof Clause 12. The isocyanate-reactive composition of one of clause 1 to clause 11, wherein the hydroflouroolefin is present in an amount of 3 to 6% by weight, or 5 to 6% by weight, based on the total weight of the isocyanate-reactive composition.

Clause 13. The isocyanate-reactive composition of one of clause 1 to clause 12, wherein the hydroflouroolefin and water are present in the isocyanate-reactive composition in a relative ratio, by weight, of 4:1 to 6:1 or 4:1 to 5:1.

Clause 14. The isocyanate-reactive composition of one of clause 1 to clause 13, wherein the isocyanate-reactive composition is substantially free of other blowing agents.

Clause 15. The isocyanate-reactive composition of one of clause 1 to clause 14, wherein the catalyst comprises a tertiary amine compound, such as triethylenediamine, N-methylmorpholine, pentamethyl diethylenetriamine, dimethylcyclohexylamine, tetra-methylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine, dimethylbenzyl amine, or a mixture thereof.

Clause 16. A methods for producing a polyurethane foam. In some embodiments, these methods comprise: (a) impingement mixing the isocyanate-reactive composition of one of clause 1 to clause 15 with a polyisocyanate in a spray gun; and (b) spraying the mixture onto a surface.

Clause 17. The method of clause 16, wherein the polyisocyanate and isocyanate-reactive composition are combined in a relative volume ratio of 1.5:1 to 1:1.5 or 1.1:1 to 1:1.1.

Clause 18. The method of clause 16 or clause 17, wherein the polyisocyanate and isocyanate-reactive composition are combined in relative amounts such that the NCO Index is 70 to 150, 90 to 150, 90 to 135, 100 to 135 or 100 to 120.

Clause 19. A polyurethane foam produced from the isocyanate-reactive composition of one of clause 1 to clause 15 or by the method of one of clause 16 to clause 18, wherein the foam has a density, as determined by ASTM D1622-14, of at least 44 kg/m$^3$, at least 48 kg/m$^3$, or at least 51 kg/m$^3$, and no more than 160 kg/m$^3$, no more than 80 kg/m$^3$, or no more than 60 kg/m$^3$.

Clause 20. The polyurethane foam of clause 19, wherein the polyurethane foam exhibits ASTM E84-16 Class A flame spread and smoke development characteristics at a foam thickness of 4 inches.

Clause 21. A substrate having the polyurethane foam of clause 19 or clause 20 applied thereto.

Clause 22. The substrate of clause 21, wherein the substrate is disposed between frame members of a wall structure.

Clause 23. A polyurethane foam-forming composition comprising: (a) a polyisocyanate, (b) an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate; (c) a catalyst, and (d) a blowing agent composition comprising: (1) water; and (2) a hydrofluoroolefin, wherein the hydrofluoroolefin is present in an amount of 1 to 6% by weight, based on the total weight of the polyurethane-foam forming composition less the weight of the polyisocyanate, and the hydroflouroolefin and water are present in the polyurethane foam-forming composition in a relative ratio, by weight, of 4:1 to 8:1.

Clause 24. The polyurethane foam-forming composition of clause 23, wherein the aromatic polyester polyol has a functionality of at least 2.7, 2.7 to 3.2 or 2.8 to 3.2.

Clause 25. The polyurethane foam-forming composition of clause 23 or clause 24, wherein the aromatic polyester polyol has an OH number of 300 to 400 mg KOH/g, 300 to 380 mg KOH/g, or 360 to 380 mg KOH/g.

Clause 26. The polyurethane foam-forming composition of one of clause 23 to clause 25, wherein the aromatic polyester polyol having a functionality of greater than 2.5 and an OH number of at least 300 mg KOH/g is present in an amount of 50 to 90% by weight, 50 to 80% by weight, 50 to 75% by weight, 65 to 75% by weight, or, 70 to 75% by weight, based on the total weight of the polyurethane foam-forming composition less the weight of the polyisocyanate.

Clause 27. The polyurethane foam-forming composition of one of clause 23 to clause 26, wherein the aromatic polyester polyol having a functionality of greater than 2.5 and an OH number of at least 300 mg KOH/g comprises a transesterification or direct esterification reaction product of a reaction mixture comprising polyol, such as glycol and a higher functionality polyols, and a terephthalate source, such as where the reaction mixture comprises 45 to 70% by weight of a glycol, 20 to 35% by weight a terephthalate source, and 5 to 20% by weight glycerin, based on the total weight of the reaction mixture.

Clause 28. The polyurethane foam-forming composition of one of clause 23 to clause 27, wherein the polyurethane foam-forming composition is substantially or completely free of polyether polyol.

Clause 29. The polyurethane foam-forming composition of one of clause 23 to clause 28, further comprising a compound, such as a monomeric compound, having at least two, such as 2 to 8 or 2 to 4, isocyanate-reactive hydrogen atoms and a molecular weight of from 32 to 399, such as ethanolamine, diethanolamine, triethanolamine, sorbitol, glycerol, or a mixture thereof, that is present in an amount of 1 to 10% by weight, such as 1 to 5% by weight, or 2 to 3% by weight, based on the total weight of isocyanate-reactive components in the polyurethane foam-forming composition.

Clause 30. The polyurethane foam-forming composition of one of clause 23 to clause 29, wherein water is present in an amount of 0.5 to 2% by weight, 0.8 to 1.5% by weight, or 1 to 1.5% by weight, based on the total weight of the polyurethane foam-forming composition less the weight of the polyisocyanate.

Clause 31. The polyurethane foam-forming composition of one of clause 23 to clause 30, wherein the hydrofluoroolefin comprises a $C_2$ to $C_6$ hydrohalogenated olefin, such as a $C_2$ to $C_6$ hydrohalogenated olefin having a boiling point of at least 10° C., such as 10° C. to 40° C. or 14° C. to 40° C., at 1 atmosphere pressure.

Clause 32. The polyurethane foam-forming composition of clause 31, wherein the $C_2$ to $C_6$ hydrohalogenated olefin comprises a hydrofluoroolefin and/or a hydrofluorochloroolefin.

Clause 33. The polyurethane foam-forming composition of clause 32, wherein the hydroflouroolefin comprises 1,1,1,4,4,4-hexafluoro-2-butene, such as the cis-form of 1,1,1,4,4,4-hexafluoro-2-butene, the trans-form of 1,1,1,4,4,4-hexafluoro-2-butene, or a mixture thereof Clause 34. The polyurethane foam-forming composition of one of clause 23 to clause 33, wherein the hydroflouroolefin is present in an amount of 3 to 6% by weight, or 5 to 6% by weight, based on the total weight of the polyurethane foam-forming composition less the weight of the polyisocyanate.

Clause 35. The polyurethane foam-forming composition of one of clause 23 to clause 34, wherein the hydroflouroolefin and water are present in the polyurethane foam-forming composition in a relative ratio, by weight, of 4:1 to 6:1 or 4:1 to 5:1.

Clause 36. The polyurethane foam-forming composition of one of clause 23 to clause 35, wherein the polyurethane foam-forming composition is substantially free of other blowing agents.

Clause 37. The polyurethane foam-forming composition of one of clause 23 to clause 36, wherein the catalyst comprises a tertiary amine compound, such as triethylenediamine, N-methylmorpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine, dimethyl-benzyl amine, or a mixture thereof Clause 38. A polyurethane foam formed from the polyurethane foam-forming composition of one of clause 23 to clause 37.

Clause 39. A method of producing the polyurethane foam of clause 38 comprising spraying the polyurethane foam-forming composition onto a surface.

Clause 40. The polyurethane foam of clause 38, wherein the polyurethane foam has a density, as determined by ASTM D1622-14, of at least 44 $kg/m^3$, at least 48 $kg/m^3$, or at least 51 $kg/m^3$, and no more than 160 $kg/m^3$, no more than 80 $kg/m^3$, or no more than 60 $kg/m^3$.

Clause 41. The polyurethane foam of clause 38 or clause 40, wherein the polyurethane foam exhibits ASTM E84-16 Class A flame spread and smoke development characteristics at a foam thickness of 4 inches.

Clause 42. A substrate having the polyurethane foam of clause 38, clause 40, or clause 41 applied thereto.

Clause 43. The substrate of clause 42, wherein the substrate is disposed between frame members of a wall structure.

The following Examples are given as being illustrative of the present invention. All parts and percentages given in these Examples are parts by weight and percentages by weight, unless otherwise indicated.

EXAMPLES

Examples 1-12

Polyol blends were prepared using the ingredients and amounts (parts by weight) listed in Table 1 below in which:

POLYOL 1 is a phthalic anhydride based polyester polyol having a hydroxyl number of 290-310 mg KOH/gram polyol and a theoretical functionality of 2.1, commercially available from Stepan Company;

POLYOL 2 is a phthalic anhydride based polyester polyol having a hydroxyl number of 340-360 mg KOH/gram polyol and a theoretical functionality of 2.4, commercially available from Stepan Company;

POLYOL 3 is an aromatic polyester polyol having a hydroxyl number of 360-380 mg KOH/gram polyol and a functionality of 3.0, commercially available as Terol® 649 from Huntsman;

POLYOL 4 is a phthalic anhydride based polyester polyol having a hydroxyl number of 311 mg KOH/gram polyol and a functionality of 2.7, commercially available as Isoexter® TB-306 from Coim;

POLYOL 5 is a sucrose/propylene glycol/water-initiated polyoxypropylene polyol having a hydroxyl number of 450-490 mg KOH/gram polyol and a functionality of 5.2;

TEA refers to Triethanolamine 99%, commercially available from Dow;

TEA LFG is Triethanolamine 99% Low Freezing Grade, commercially available from Dow;

EB is ethylene glycol monobutyl ether solvent;

FR 1 is tris (1-chloro-2-propyl) phosphate) flame retardant;

FR 2 is a reactive, high-bromine-content diol mixture flame retardant, commercially available as SAYTEX® RB-7980 from Albemarle;

SURFACTANT 1 is a non-hydrolyzable silicone polyether surfactant, commercially available as Silstab® 2100 from Siletch Corporation;

SURFACTANT 2 is a silicone surfactant, commercially available as VORASURF™ DC 193 from Dow;

CATALYST 1 is N,N,N',N",N"-pentamethyl-dipropylen-etriamine, commercially available as Jeffcat® ZR-40 from Huntsman;

CATALYST 2 is N,N-bis(3-dimethylaminopropyl)-N-isopropanolamine, commercially available as Jeffcat® ZR-50 rom Huntsman;

CATALYST 3 is a reactive amine catalyst, commercially available as Polycat 143;

CATALYST 4 is 1,2-dimethylimidazole, commercially available as DABCO® 2041 from Evonik);

CATALYST 5 is dibutyltin diisooctylmaleate, commercially available as DABCO® T125 from Evonik;

HFC is 1,1,1,3,3-Pentafluoropropane, which is also known as HFC245fa; and HFO is cis-1,1,1,4,4,4-hexafluoro-2-butene, commercially available as Opteon™ 1100 from The Chemours Company FC, LLC.

To prepare the polyol blends, all components were added to a suitable container and mixed at about room temperature. The polyol blends were spray applied to an oriented strand board (OSB) substrate framed with 2×4 dimensional lumber wall studs using a Graco HVR machine with 60 feet of heated hose using a Graco Fusion CP spray gun equipped with a 42/42 mix chamber, using a mix ratio of 1:1 by volume with Mondur® MR (a polymeric diphenylmethane diisocyanate (pMDI) having a NCO content of at least 31.0%, a viscosity of 150 to 250 mPa·s @ 25° C.; and an average equivalent weight of 132, commercially available from Covestro LLC. The following parameters were used in the spray operation: Temperature of resin and isocyanate: 85° F.; Temperature of polyol blend and isocyanate in machine: 125° F.; Temperature of machine hose: 125° F.; Set pressures of polyol blend and isocyanate in machine: 1500 psi.

Results of flammability testing are set forth in Table 1. All foams had a density of about 3 lb/ft$^3$ according to ASTM D1622-14 and were dimensionally stable.

TABLE 1

| Chemicals | Example | | | | | | |
|---|---|---|---|---|---|---|---|
| | 1 | 2 | 3 | 4 | 5 | 6 | 7 |
| POLYOL 1 | 43.17 | 43.17 | 42.55 | — | — | — | — |
| POLYOL 2 | 10.79 | 10.79 | 10.64 | — | — | — | — |
| POLYOL 3 | — | — | — | 62.21 | 62.21 | 68.08 | 65.55 |
| POLYOL 4 | — | — | — | — | — | — | — |
| POLYOL 5 | 9.72 | 9.72 | 9.57 | 3.91 | 3.91 | — | — |
| TEA | — | — | — | — | — | — | — |
| TEA LFG | 7.09 | 7.09 | 6.99 | 6.07 | 6.07 | 4.12 | 3.96 |
| EB | 2.91 | 2.91 | 2.87 | 2.93 | 2.93 | 2.93 | 4.71 |
| FR 1 | 11.66 | 11.66 | 11.49 | 10.75 | 10.75 | 10.75 | 10.35 |
| FR 2 | 4.86 | 4.86 | 4.79 | 4.89 | 4.89 | 4.89 | 4.71 |
| SURFACTANT 1 | 1.26 | 1.26 | 1.24 | 1.27 | 1.27 | 1.27 | 1.22 |
| SURFACTANT 2 | — | — | — | — | — | — | — |
| CATALYST 1 | 0.39 | 0.39 | 0.38 | 0.14 | 0.14 | 0.14 | 0.38 |
| CATALYST 2 | — | 1.46 | 1.44 | 0.51 | 0.51 | 0.51 | 1.41 |
| CATALYST 3 | 1.46 | — | — | — | — | — | — |
| CATALYST 4 | 0.39 | 0.39 | 0.38 | 0.14 | 0.14 | 0.14 | 0.38 |
| CATALYST 5 | 0.29 | 0.29 | 0.29 | 0.10 | 0.10 | 0.10 | 0.28 |
| Water | — | — | — | 1.08 | 1.08 | 1.08 | 1.41 |
| HFC | 6 | 6.00 | — | — | — | — | — |
| HFO | — | — | 7.36 | 6.00 | 6.00 | 6.00 | 5.65 |
| Mini Tunnel Flame Spread | 15 | 25.5 | 23.5 | 24 | 23 | 21 | 22 |
| Mini Tunnel Smoke | 200 | 589 | 533.5 | 408 | 484 | 406 | 384 |

| Chemicals | Example | | | | |
|---|---|---|---|---|---|
| | 8 | 9 | 10 | 11 | 12 |
| POLYOL 1 | — | — | — | — | — |
| POLYOL 2 | — | — | — | — | — |
| POLYOL 3 | 66.77 | 69.84 | 74.49 | 73.38 | — |
| POLYOL 4 | — | — | — | — | 73.38 |
| POLYOL 5 | — | — | — | — | — |
| TEA | — | — | — | 1.88 | 1.88 |
| TEA LFG | 4.04 | 1.92 | 1.91 | — | — |
| EB | 4.79 | 3.83 | 3.83 | 3.77 | 3.77 |
| FR 1 | 10.54 | 10.54 | 7.65 | 7.54 | 7.54 |
| FR 2 | 4.79 | 4.79 | 2.87 | 2.83 | 2.83 |
| SURFACTANT 1 | 1.25 | 1.25 | 1.44 | — | — |
| SURFACTANT 2 | — | — | — | 1.41 | 1.41 |
| CATALYST 1 | 0.13 | 0.13 | 0.13 | 0.38 | 0.38 |
| CATALYST 2 | 0.50 | 0.50 | 0.50 | 1.41 | 1.41 |
| CATALYST 3 | — | — | — | — | — |
| CATALYST 4 | 0.13 | 0.13 | 0.13 | 0.38 | 0.38 |
| CATALYST 5 | 0.10 | 0.10 | 0.10 | 0.19 | 0.19 |
| Water | 1.20 | 1.20 | 1.20 | 1.18 | 1.18 |
| HFC | — | — | — | — | — |

TABLE 1-continued

| | | | | | |
|---|---|---|---|---|---|
| HFO | 5.75 | 5.75 | 5.74 | 5.65 | 5.65 |
| Mini Tunnel Flame Spread | 22 | 21 | 22 | 20 | 20 |
| Mini Tunnel Smoke | 387 | 345 | 306 | 350 | 325 |

Examples 13-15

In each Example, 8' (high)×4' (long) wall panels were assembled, with studs 24" on-center, and 1" Hunter PW-CG polyiso board attached to the front frame surface as continuous insulation. The polyiso board was fastened to the stud frame with button-cap nails at a frequency of 12" on the perimeter, and 24" in the field. For each example, triplicate wall panels were prepared. Spray foam was deposited at a target spray foam nominal thickness of 1.5" throughout the stud cavities, using the spray foam formulations listed in Table 2. Example 13 is a comparative example using a spray foam formulation of the type described by Example 1. Examples 14 and 15 are inventive examples using inventive foam-forming compositions similar to that described with respect to Example 11.

The wall panels were tested to determine lateral load performance by applying a horizontal load to the panel through a truss. The test used the procedures defined in ASTM E564-18, where applicable. An actuator recorded the force applied to the wall panel. The lateral load was applied to the top of the wall using a parallel chord truss. Following the loading procedures of ASTM E564-18, an ultimate lateral load for each wall was established and was used to determine the 10% preloading, one-third step, and two-thirds step loading values. Loading was applied according to ASTM E564-18. Results are listed in Table 2.

TABLE 2

| Example | Ultimate Load (lbs) | Average Ultimate Load (lbs) | Ultimate Shear Strength (plf) | Average Ultimate Shear Strength (plf) |
|---|---|---|---|---|
| 13a | 1,954 | 2,038 | 488 | 509 |
| 13b | 2,119 | | 530 | |
| 13c | 2,042 | | 510 | |
| 14a | 2,498 | 2,455 | 625 | 614 |
| 14b | 2,692 | | 673 | |
| 14c | 2,176 | | 544 | |
| 15a | 2,083 | 2,383 | 521 | 596 |
| 15b | 2,447 | | 612 | |
| 15c | 2,619 | | 655 | |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112, first paragraph, and 35 U.S.C. § 132(a).

What is claimed is:

1. An isocyanate-reactive composition comprising:
   (a) a terephthalate based aromatic polyester polyol having a functionality of greater than 2.5 and an OH number of at least 300 mg KOH/g, which is present in an amount of at least 50% by weight, based on total weight of the isocyanate-reactive composition;
   (b) a catalyst; and
   (c) a blowing agent composition comprising:
      (1) water; and
      (2) a hydrofluoroolefin, wherein
   the hydrofluoroolefin is present in an amount of 1 to 6% by weight, based on total weight of the isocyanate-reactive composition, and
   the hydrofluoroolefin and water are present in the isocyanate-reactive composition in a relative ratio, by weight, of 4:1 to 8:1.

2. The isocyanate-reactive composition of claim 1, wherein the aromatic polyester polyol has a functionality of 2.7 to 3.2 and an OH number of 300 to 380 mg KOH/g.

3. The isocyanate-reactive composition of claim 1, wherein the aromatic polyester polyol having a functionality of greater than 2.5 and an OH number of at least 300 mg KOH/g is present in an amount of 65 to 75% by weight, based on total weight of the isocyanate-reactive composition.

4. The isocyanate-reactive composition of claim 1, wherein the isocyanate-reactive composition comprises a monomeric compound having 2 to 4 isocyanate-reactive hydrogen atoms and a molecular weight of from 32 to 399 that is present in an amount of 1 to 5% by weight, based on total weight of isocyanate-reactive components in the isocyanate-reactive composition.

5. The isocyanate-reactive composition of one of claim 1, wherein water is present in an amount of 0.8 to 1.5% by weight, based on total weight of the isocyanate-reactive composition.

6. The isocyanate-reactive composition of claim 1, wherein the hydrofluoroolefin comprises 1,1,1,4,4,4-hexafluoro-2-butene.

7. The isocyanate-reactive composition of claim 6, wherein the 1,1,1,4,4,4-hexafluoro-2-butene is present in an amount of 3 to 6% by weight, based on total weight of the isocyanate-reactive composition.

8. The isocyanate-reactive composition of claim 1, wherein the hydrofluoroolefin and water are present in the isocyanate-reactive composition in a relative ratio, by weight, of 4:1 to 6:1.

9. The isocyanate-reactive composition of claim 1, wherein the isocyanate-reactive composition is substantially free of other blowing agents.

10. The isocyanate-reactive composition of claim 1, wherein the catalyst comprises a tertiary amine compound.

11. A method for producing a polyurethane foam, comprising:
(a) impingement mixing the isocyanate-reactive composition of claim 1 with a polyisocyanate in a spray gun to provide a mixture thereof; and
(b) spraying the mixture onto a surface.

12. The isocyanate-reactive composition of claim 1, wherein the terephthalate based aromatic polyester polyol is a reaction product of a reaction mixture comprising 45 to 70% by weight of a glycol, 20 to 35% by weight of a terephthalate source, and 5 to 20% by weight of glycerin, based on the total weight of the reaction mixture used to produce the terephthalate based aromatic polyester polyol.

13. The isocyanate-reactive composition of claim 1, terephthalate based aromatic polyester polyol is a reaction product of a reaction mixture comprising a polyol and a terephthalate source, wherein the terephthalate source comprises polyethylene terephthalate (PET) and/or terephthalic acid.

14. The isocyanate-reactive composition of claim 13, wherein the terephthalate source comprises PET.

15. The isocyanate-reactive composition of claim 14, wherein the PET comprises industrial recycled PET and/or post-consumer PET.

16. The isocyanate-reactive composition of claim 14, with the proviso that the isocyanate-reactive composition does not include a sucrose-based polyether polyol.

* * * * *